(12) United States Patent
Nakagawa (10) Patent No.: US 10,303,024 B2
(45) Date of Patent: May 28, 2019

(54) DISPLAY APPARATUS AND METHOD OF MANUFACTURING DISPLAY APPARATUS

(71) Applicant: Sakai Display Products Corporation, Sakai-shi, Osaka (JP)

(72) Inventor: Hidetoshi Nakagawa, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 152 days.

(21) Appl. No.: 15/536,476

(22) PCT Filed: Dec. 26, 2014

(86) PCT No.: PCT/JP2014/084596
§ 371 (c)(1),
(2) Date: Jun. 15, 2017

(87) PCT Pub. No.: WO2016/103475
PCT Pub. Date: Jun. 30, 2016

(65) Prior Publication Data
US 2017/0351151 A1 Dec. 7, 2017

(51) Int. Cl.
*G02F 1/13* (2006.01)
*G09G 3/36* (2006.01)
(Continued)

(52) U.S. Cl.
CPC ........ *G02F 1/136259* (2013.01); *G02F 1/136* (2013.01); *G02F 1/1309* (2013.01);
(Continued)

(58) Field of Classification Search
CPC ... G02F 1/136259; G02F 1/1309; G02F 1/136
See application file for complete search history.

(56) References Cited

U.S. PATENT DOCUMENTS

2003/0179158 A1 9/2003 Sakaki
2010/0060559 A1 3/2010 Nakagawa
(Continued)

FOREIGN PATENT DOCUMENTS

| JP | 2004-004492 A | 1/2004 |
|---|---|---|
| WO | WO2007020784 A1 | 2/2007 |
| WO | WO2013011855 A1 | 1/2013 |

OTHER PUBLICATIONS

Machine translation of Masatoshi Shinagawa (JP2007335482A) (Year: 2007).*

*Primary Examiner* — Lucy P Chien
(74) *Attorney, Agent, or Firm* — Bret E. Field; Bozicevic, Field & Francis LLP (57) ABSTRACT

An example display apparatus includes: a display panel having a display region and a non-display region located at peripheries of the display region; a signal line provided in the display panel to transmit an image signal; a spare wiring routed to an outside of the display panel and the non-display region of the display panel, and connected to the signal line; a plurality of connection terminals; and an amplifier which have an input side connected to a first connection terminal and an output side connected to the spare wiring, and the display apparatus is configured to input a signal from the signal line to the amplifier through the first connection terminal. On the output side of the amplifier, a part of the spare wiring is connected to a second connection terminal, and is routed to the non-display region from the outside of the display panel. The part of the spare wiring is further connected a third connection terminal, and is routed to the outside of the display panel.

10 Claims, 8 Drawing Sheets

(51) Int. Cl.
*G02F 1/136* (2006.01)
*G09F 9/302* (2006.01)
*G02F 1/1362* (2006.01)

(52) U.S. Cl.
CPC .............. *G09G 3/36* (2013.01); *G09G 3/3611* (2013.01); *G02F 2001/136254* (2013.01); *G02F 2001/136263* (2013.01); *G02F 2001/136272* (2013.01); *G09F 9/302* (2013.01); *G09G 2300/0413* (2013.01); *G09G 2300/0426* (2013.01); *G09G 2330/08* (2013.01)

(56) References Cited

U.S. PATENT DOCUMENTS

2014/0022232 A1* 1/2014 Uehata ................. G09G 3/3614
 345/212
2014/0132873 A1 5/2014 Ogasawara et al.

\* cited by examiner

DISPLAY APPARATUS AND METHOD OF MANUFACTURING DISPLAY APPARATUS

CROSS-REFERENCE TO RELATED APPLICATIONS

This application is the national phase under 35 U.S.C. § 371 of PCT International Application No. PCT/JP2014/084596 which has International filing date of Dec. 26, 2014 and designated the United States of America.

FIELD

The technology herein relates to a display apparatus which displays an image and a method of manufacturing a display apparatus.

BACKGROUND AND SUMMARY

Thin display apparatuses, for example, liquid crystal display apparatuses, have been widely distributed since a display area is large in comparison with an installation area thereof. For example, in an active matrix type liquid crystal display apparatus, a plurality of data signal lines and scanning signal lines are arranged in a matrix.

A thin film transistor and a pixel electrode connected to the thin film transistor are provided in the vicinity of an intersection point of both signal lines. The thin film transistor is controlled ON/OFF by the scanning signal line, and when signal potentials are applied to each pixel electrode from the data signal line, an alignment state of liquid crystal is changed, thus to display information.

In recent years, further improvement of display quality has been required, and a line width of the data signal line has become very thin as 10 µm or less (for example, 6 µm). Therefore, a disconnection may easily occur in a manufacturing process. For example, when dust is entrained during film formation or pinholes are generated in a resist mask during etching, a disconnection occurs.

When a disconnection occurs in the data signal line, a correct signal potential cannot be written in the pixel electrode after the disconnection location. As a result, a black line (in a normally black mode) and a bright line (in a normally white mode) appear on a screen.

In order to correct such a disconnection, for example, a spare wiring is provided from the vicinity of an end part on a signal input side of the data signal line to the vicinity of an end part on a side opposite to the data signal line (a lower side of a display region) through a panel external substrate or the like. By melt connecting the end part (a terminal end part) of the portion after the disconnection location in the disconnected data signal line and the spare wiring using a laser beam or the like, a signal is input to the portion after the disconnection location.

When resistance values in the data signal line and the spare wiring are large, a large loss may occur in a signal output which is input through the spare wiring.

Therefore, it is preferable that the resistance values in the data signal line and the spare wiring are small.

In consideration of the above-mentioned circumstances, it is an object to provide an aspect of disclosure of a display apparatus which may reduce resistance values in a data signal line and a spare wiring, and a method of manufacturing a display apparatus.

According to an aspect of disclosure, there is provided a display apparatus which includes: a display panel having a display region and a non-display region located at peripheries of the display region; a signal line provided in the display panel to transmit an image signal; a spare wiring routed to an outside of the display panel and the non-display region of the display panel, and which is to be connected to the signal line; a plurality of connection terminals; and an amplifier of which an input side is connected to a first connection terminal and an output side is connected to the spare wiring, and is configured to input a signal from the signal line to the amplifier through the first connection terminal, wherein, on the output side of the amplifier, a part of the spare wiring is connected to a second connection terminal, is routed to the non-display region from the outside of the display panel, is further connected a third connection terminal, and is routed to the outside of the display panel.

The display apparatus may include: a wiring provided at a periphery of the display panel; a second signal line provided in the display panel to transmit the image signal; a connection part provided in the display panel, and connecting the wiring and the second signal line; and a second amplifier of which an input side is connected to the connection part and an output side is connected to the wiring, wherein a part of the wiring may be connected to a fourth connection terminal, be routed from the outside of the display panel to the non-display region, be further connected to a fifth connection terminal, be routed to the outside of the display panel, and be connected to the spare wiring.

The display apparatus may include identification marks configured to identify the second and third connection terminals, and the fourth and fifth connection terminals.

The display apparatus may include a second spare wiring provided at a periphery of the display panel, wherein the spare wiring connected to the second connection terminal and routed from the outside of the display panel to the non-display region may be further connected to a sixth connection terminal, be routed to the outside of the display panel, and be connected to the second spare wiring.

In the display apparatus, the display panel may be provided with a substrate having the spare wiring on the outside of the display panel.

According to another aspect of disclosure, there is provided a method of manufacturing a display apparatus which includes: a display panel having a display region and a non-display region located at peripheries of the display region; a plurality of signal lines provided in the display panel to transmit image signals; a spare wiring routed to an outside of the display panel and the non-display region of the display panel, and connected to the signal lines; a plurality of connection parts which correspond to each of the plurality of signal lines and have a plurality of connection terminals; and amplifiers which correspond to each of the connection parts, and have an input side connected to a first connection terminal and an output side connected to the spare wiring, wherein the display apparatus is configured to input a signal from the signal line to the amplifier through the first connection terminal, wherein a part of the spare wiring is connected to a second connection terminal, is routed to the non-display region from the outside of the display panel, is further connected a third connection terminal, and is routed to the outside of the display panel, the method including: inspecting whether each of the plurality of signal lines is disconnected; connecting one signal line in which a disconnection is detected in the inspection step and a first connection terminal of the connection part corresponding to one signal line; and disconnecting a second connection terminal of the connection part corresponding to a different signal line.

On one side of the display panel, the spare wiring is provided at the outside of the display panel. The plurality of signal lines that can be connected to the spare wiring are provided in the display panel. In addition, the connection parts corresponding to each of the plurality of signal lines are provided. The amplifier having a plurality of connection terminals is provided between the connection part and the spare wiring. In the present invention, the input side of the amplifier is connected to the first connection terminal and the output side of the amplifier is connected to the spare wiring. A part of the spare wiring is routed to the display panel through the second connection terminal, and is routed to the outside of the display panel through the third connection terminal. When one disconnected signal line is connected to the spare wiring by melting with a laser beam, or the like, the signal is input to the one signal line, and the amplifier and the spare wiring in one connection part which is corresponding to another signal line are disconnected by disconnecting the second connection terminal and the third connection terminal in the connection part.

According to the disclosure, the wiring, the second signal line, the second connection part and the second amplifier are included. The input side of the second amplifier is connected to the second connection part, and the output side thereof is connected to the wiring. The second signal line is connected to the second connection part. A part of the wiring is connected to the fourth connection terminal of the connection part, is routed to the display panel, is connected to the fifth connection terminal, is routed to the outside of the display panel, and is connected to the spare wiring. When connecting the signal line and the spare wiring, the fourth and fifth connection terminals are disconnected. When connecting the second signal line and the spare wiring, the second and third connection terminals are disconnected. The second to fifth connection terminals, which are in a location where the spare wiring and the wiring may be concentrated in, are concentrated in the connection part.

According to the disclosure, a manufacturer may confirm the identification marks to recognize the location to be disconnected.

According to the disclosure, when one signal line is connected to the spare wiring, the connection of the connection part corresponding to another signal line and the spare wiring is cut off. In addition, when the one signal line is connected to the second spare wiring, the second spare wiring and the connection part corresponding to the other signal line are disconnected.

According to the disclosure, by providing the spare wiring on the substrate, a configuration, in which a resistance value of the spare wiring is smaller than that of the connection part, may be achieved.

According to the display apparatus and the method of manufacturing the display apparatus, the input side of the amplifier is connected to the first connection terminal and the output side of the amplifier is connected to the spare wiring. A part of the spare wiring is routed to the display panel through the second connection terminal, and is routed to the outside of the display panel through the third connection terminal. When one disconnected signal line is connected to the spare wiring by melting with a laser beam, or the like, the signal is input to the one signal line, and the amplifier and the spare wiring in one connection part which is corresponding to another signal line are disconnected by disconnecting the second connection terminal and the third connection terminal in the connection part. A distance from the melt connected location of the one signal line to the spare wiring is decreased, and thereby a resistance of an entire wiring after the repair may be reduced.

The above and further objects and features will more fully be apparent from the following detailed description with accompanying drawings.

DETAILED DESCRIPTION OF NON-LIMITING EXAMPLE EMBODIMENTS

Embodiment 1

Figure 1:
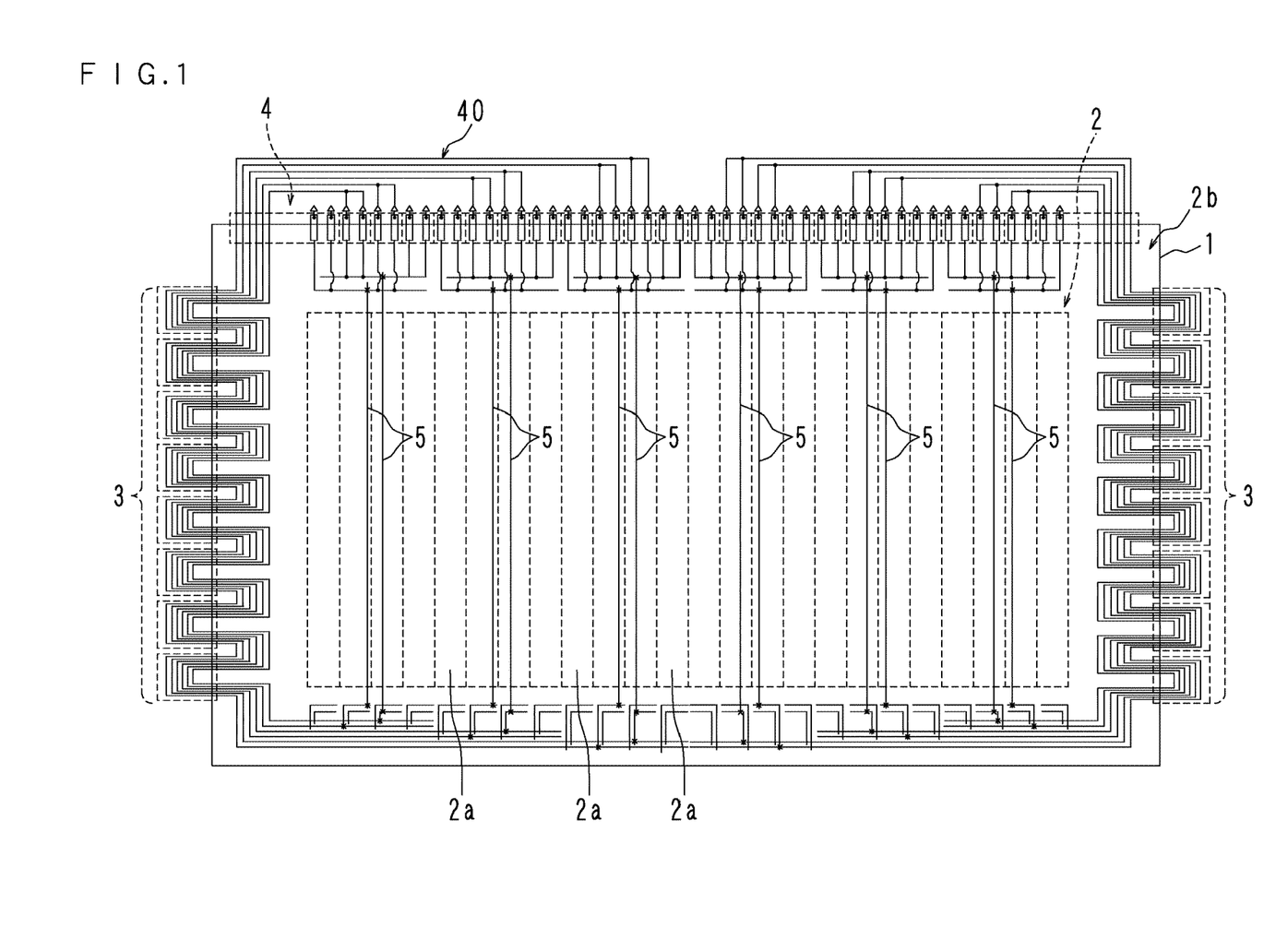
FIG. 1 is a plan view schematically illustrating a major part of a display apparatus.
Figure 2:
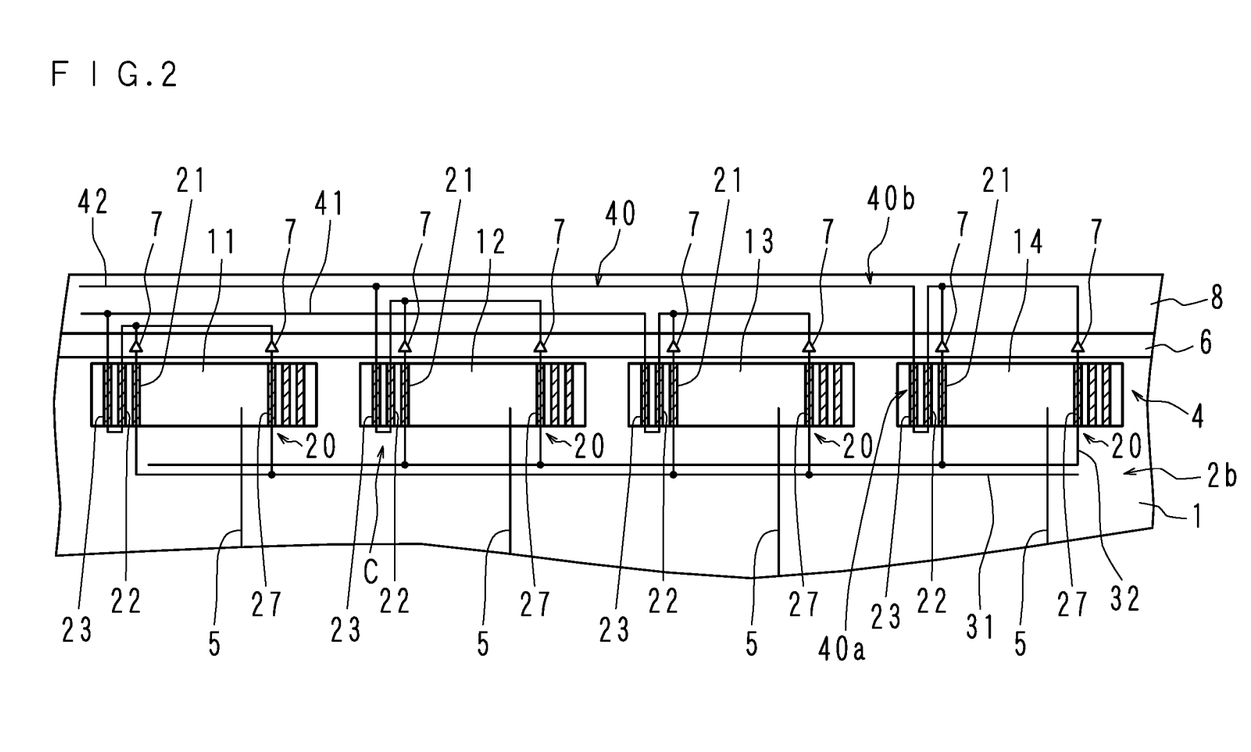
FIG. 2 is an enlarged plan view schematically illustrating a configuration in the vicinity of a source terminal part.

Hereinafter, the present invention will be described with reference to the drawings illustrating a display apparatus according to Embodiment 1. FIG. 1 is a plan view schematically illustrating a major part of the display apparatus, and FIG. 2 is an enlarged plan view schematically illustrating a configuration in the vicinity of a source terminal part.

The display apparatus has a laterally long rectangular display panel 1 having liquid crystal, and a central part of the display panel 1 is a display region 2 on which a laterally long rectangular image is displayed. In the display panel 1, peripheries of the display region 2 becomes a non-display region 2b formed in a laterally elongated rectangular frame shape, on which an image is not displayed. A plurality of gate terminal parts 3, 3, . . . and 3 are longitudinally arranged in parallel on respective short sides of the display panel 1 (a right side or a left side in FIG. 1). From the respective gate terminal parts 3, scanning signal lines (not illustrated) extend in a lateral direction. In the display region 2, a plurality of data signal lines 5, 5, . . . and 5 extending in a longitudinal direction are arranged in parallel in the lateral direction. The data signal line 5 and the scanning signal line are orthogonal to each other, and are arranged in a matrix on the display panel 1.

A thin film transistor (not illustrated) and a pixel electrode (not illustrated) connected to the thin film transistor are provided in the vicinity of an intersection point of the data signal line 5 and the scanning signal line. The thin film transistor is ON/OFF controlled by the scanning signal line, and when a signal potential is applied to each pixel electrode from the data signal line 5, an alignment state of the liquid crystal is changed, thus to display information.

The display region 2 has a plurality of (twenty-four in the present embodiment) display blocks 2a, 2a, . . . and 2a. The data signal line 5 is provided in each of the display blocks 2a. Further, in FIG. 1, a part of the data signal lines 5 is not illustrated.

As illustrated in FIG. 2, a source substrate 8 is provided at an outside on one long side (an upper side in FIG. 1) of the display panel 1. The source substrate 8 is located adjacent to the display panel 1, and is located at the outside of the non-display region 2b.

A plurality of spare wirings 40 are disposed at the peripheries of the display panel 1, and the spare wirings 40 are provided in the non-display region 2b or outside of the display panel 1. The spare wiring 40 is routed from a middle part on one long side of the display panel 1 to the short side along the long side, and is further routed to the other long side (a lower side in FIG. 1) along the short side. On the short side, the spare wiring 40 is connected to the gate terminal part 3. The spare wiring 40 is further routed to a central part of the long side along the other long side of the display panel 1. Both end parts of the data signal line 5 are provided to be connected to the spare wiring 40 on both long sides of the display panel 1, respectively.

In the non-display region 2b, a plurality of (twenty-four in the present embodiment) source terminal parts 4, 4, . . . and 4 are arranged in parallel in the lateral direction on one long side of the display panel 1. Each of the source terminal parts 4 corresponds to the respective display blocks 2a, and corresponds to the respective data signal lines 5. The source terminal part 4 includes a plurality of connection terminals 20, 20, . . . and 20 arranged in parallel in the lateral direction.

The plurality of connection terminals 20 include first to third connection terminals 21 to 23, and an amplifier connection terminal 27, respectively. The first to third connection terminals 21 to 23 are sequentially arranged, and the second connection terminal 22 is located between the first and third connection terminals 21 and 23. The amplifier connection terminal 27 is separated from the first to third connection terminals 21 to 23. Further, the first connection terminal 21 functions as an amplifier connection terminal.

Between the source terminal part 4 and the display block 2a, a first trunk line 31 and a second trunk line 32 are provided in the non-display region 2b of the display panel 1. Each of the first trunk line 31 and the second trunk line 32 extends in the lateral direction across the four source terminal parts 4, 4, 4, and 4. Hereinafter, the four source terminal parts 4 will be referred to as first to fourth source terminal parts 11 to 14, respectively. The first to fourth source terminal parts 11 to 14 are sequentially arranged in the lateral direction.

The first trunk line 31 is connected to input sides of the first connection terminal 21 and the amplifier connection terminal 27, in the first source terminal part 11 and the third source terminal part 13. The second trunk line 32 is connected to the input side of the first connection terminal 21 and the amplifier connection terminal 27, in the second source terminal part 12 and the fourth source terminal part 14.

One end part of the data signal line 5 is orthogonal to the first trunk line 31 and the second trunk line 32 in a plan view. The data signal line 5 and the first trunk line 31 and second trunk line 32 are laminated through an insulation film (not illustrated). In other words, the data signal line 5 and the first trunk line 31 and second trunk line 32 are not electrically connected. By irradiating an intersection point of one end part of the data signal line 5 and the first trunk line 31 or the second trunk line 32 with a laser beam, both lines may be melt connected.

In the other long side portion of the display panel 1, two L-shaped trunk lines orthogonal to the other end part of the data signal line 5 and the spare wiring 40 are provided in a plan view. The trunk lines and the other end part of the data signal line 5 and the spare wiring 40 are not electrically connected. By irradiating the respective intersection points of the other end part of the data signal line 5 and spare wiring 40 and the trunk lines with a laser beam, the respective intersection points may be melt connected.

Two spare wirings 40 and 40 are assigned to four display blocks 2a, 2a, 2a and 2a, and the two spare wirings 40 are mounted on the source substrate 8. Hereinafter, the two spare wirings 40 are referred to as a first spare wiring 41 and a second spare wiring 42. The first spare wiring 41 and the second spare wiring 42 extend by the source substrate 8 in the lateral direction.

Chip on films (COFs) 6 are provided between the display panel 1 and the source substrate 8, and two amplifiers 7 and 7 are mounted on the COF 6. Although a plurality of COFs 6 are provided corresponding to the connection terminals 20, in order to facilitate the understanding, the COFs 6 are illustrated in a simplified manner in FIG. 2. An input side of one amplifier 7 is connected to an amplifier connection terminal 27. An input side of the other amplifier 7 is connected to the first connection terminal 21.

In the first source terminal part 11 or the third source terminal part 13, when an input side of the amplifier 7 is connected to the first connection terminal 21 or the amplifier connection terminal 27, an output side of the amplifier 7 is connected to the first spare wiring 41. In the first source terminal part 11 or the third source terminal part 13, a part of the first spare wiring 41 is connected to the second connection terminal 22, is routed in the display panel 1, is further connected to the third connection terminal 23, is routed to the outside of the display panel 1, and is returned to the source substrate 8.

In the second source terminal part 12 or the fourth source terminal part 14, when the input side of the amplifier 7 is connected to the first connection terminal 21 or the amplifier connection terminal 27, the output side of the amplifier 7 is connected to the second spare wiring 42. In the second source terminal part 12 or the fourth source terminal part 14, a part of the second spare wiring 42 is connected to the second connection terminal 22, is routed in the display panel 1, is further connected to the third connection terminal 23, is routed to the outside of the display panel 1, and is returned to the source substrate 8.

The source terminal part 4 is formed in the display panel 1. The source substrate 8 is provided at the outside the display panel 1. A portion 40a of the spare wiring 40 provided in the source terminal part 4 and a portion 40b of the spare wiring 40 provided in the source substrate 8 are made of substantially the same material (for example, copper). A thickness of the portion 40a is thinner than the thickness of the portion 40b. Therefore, a resistance value in the source terminal part 4 is higher than the resistance value in the source substrate 8. In other words, the resistance of the spare wiring 40 in the display panel 1 is higher than the resistance of the spare wiring 40 in the outside of the display panel 1.

A predetermined number (for example, six) of the connection terminals 20 provided for the spares are provided at each of both end parts of the source terminal part 4. The connection terminals 20 for the spares are used to connect the above-described gate terminal part 3 and the source terminal part 4 by the spare wiring 40. When the source terminal part 4 is located at the end part of the long side of the display panel 1, the connection terminals 20 for the spares are used for the above purpose. However, when the source terminal part 4 is located at the middle part of the long side, the connection terminals 20 for the spares are not used for the above purpose, but are in an empty state. These empty connection terminals 20 are used as the second and third connection terminals 22 and 23, and the limited space of the display panel 1 is efficiently used.

Figure 3:
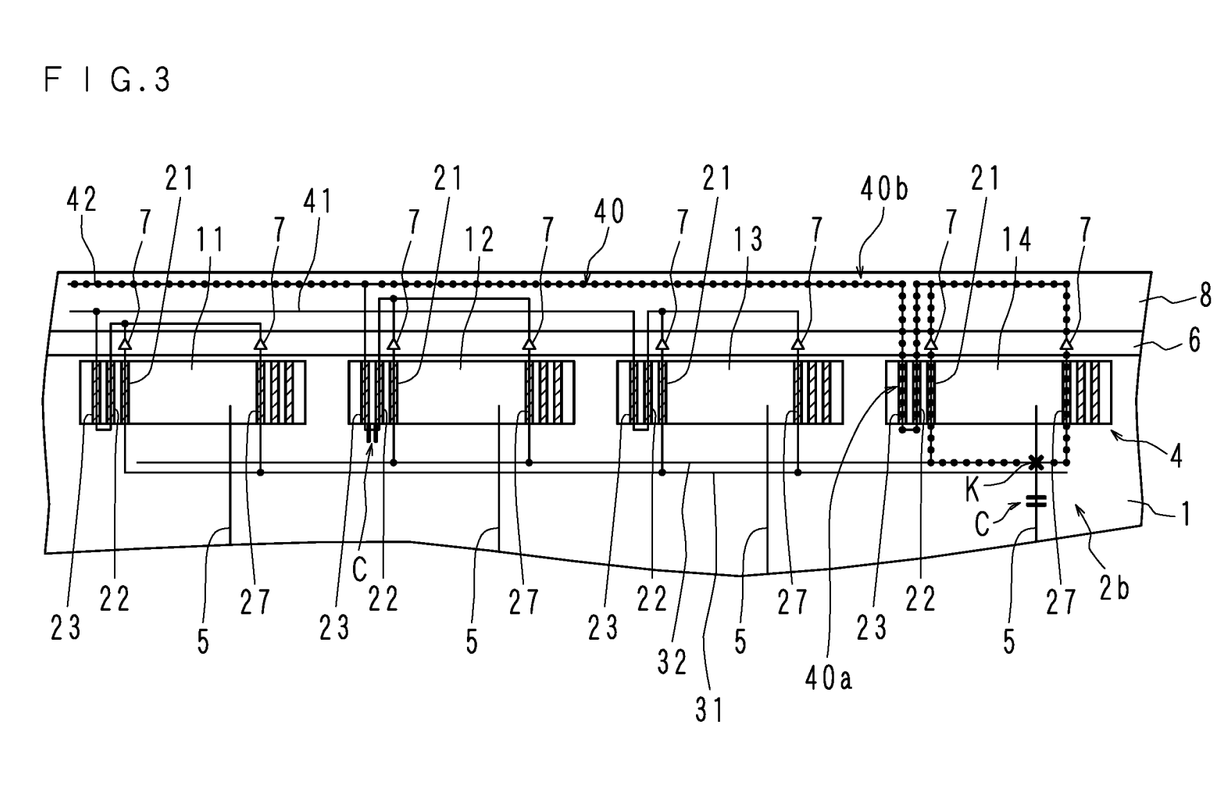
FIG. 3 is an enlarged plan view schematically illustrating a state in which the data signal line is connected to a second trunk line when a data signal line corresponding to a fourth source terminal part is disconnected.

FIG. 3 is an enlarged plan view schematically illustrating a state in which the data signal line 5 is connected to the second trunk line 32 when the data signal line 5 corresponding to the fourth source terminal part 14 is disconnected. Further, in FIG. 3, a double line indicates a cutting location C, and a cross mark indicates a connection location K. In addition, dots indicate that a signal from the data signal line 5 is being transmitted to the spare wiring 40.

An inspection to check whether the data signal line 5 is disconnected is performed on the display apparatus, and then the display apparatus is manufactured. In this inspection, for example, when it is found that the data signal line 5 corresponding to the fourth source terminal part 14 is disconnected, one end part of the data signal line 5 and the second trunk line 32 are melt connected. In addition, in the other long side portion of the display panel 1, by irradiating the respective intersection points of the other end part of the data signal line 5 and second spare wiring 42 and the trunk lines with a laser beam, the respective intersection points are melt connected. Further, in the second source terminal part 12, the connection of the first and second connection terminals 21 and 22 is cut off.

By connecting the data signal line 5 and the second trunk line 32, the signal of the data signal line 5 is input to both amplifiers 7 and 7 through the first connection terminal 21 and the amplifier connection terminal 27, and is outputted therefrom with being amplified. The signal output from the amplifier 7 is transmitted to the second spare wiring 42, is transmitted to the other long side of the display panel 1 via the second connection terminal 22 and the third connection terminal 23, and is input to the other end part of the data signal line 5.

In the second source terminal part 12, by cutting off the connection of the first and second connection terminals 21 and 22, the signal transmitted to the second spare wiring 42 is not input to the output side of the amplifier 7 connected to the second source terminal part 12. Therefore, a damage of the amplifier 7 may be prevented.

When the data signal line 5 corresponding to the second source terminal part 12 is disconnected, one end part of the data signal line 5 and the second trunk line 32 are melt connected. In addition, on the other long side of the display panel 1, the respective intersection points of the other end part of the data signal line 5 and second spare wiring 42 and the trunk lines are melt connected, and in the fourth source terminal part 14, the connection of the first and second connection terminals 21 and 22 is cut off.

When the data signal line 5 corresponding to the first source terminal part 11 is disconnected, one end part of the data signal line 5 and the first trunk line 31 are melt connected. In addition, on the other long side of the display panel 1, the respective intersection points of the other end part of the data signal line 5 and first spare wiring 41 and the trunk lines are melt connected, and in the third source terminal part 13, the connection of the first and second connection terminals 21 and 22 is cut off.

When the data signal line 5 corresponding to the third source terminal part 13 is disconnected, one end part of the data signal line 5 and the first trunk line 31 are melt connected. In addition, on the other long side of the display panel 1, the respective intersection points of the other end part of the data signal line 5 and first spare wiring 41 and the trunk lines are melt connected, and in the first source terminal part 11, the connection of the first and second connection terminals 21 and 22 is cut off.

In the display apparatus and a method of manufacturing the display apparatus according to Embodiment 1, the input side of the amplifier 7 is connected to the first connection terminal 21, and the output side of the amplifier 7 is connected to the spare wiring 40. A part of the spare wiring 40 is routed to the inside of the display panel 1 through the second connection terminal 22, and is routed to the outside of the display panel 1 through the third connection terminal 23. A resistance value of the source terminal part 4 is higher than that of the spare wiring 40.

When the disconnected one data signal line 5 and the spare wiring 40 are connected by melting with a laser beam, or the like, a signal is input to the one data signal line 5, and the amplifier 7 and the spare wiring 40 in the source terminal part 4 corresponding to the other data signal line 5 are disconnected by disconnecting the second connection terminal 22 and the third connection terminal 23 in the source terminal part 4.

Since one data signal line 5 is routed to the inside of the display panel 1 through the second connection terminal 22 and the third connection terminal 23, and then is routed to the outside, a distance from the melt connected location to the spare wiring 40 with a lower resistance value is decreased, and thereby the resistance of an entire wiring after the repair may be reduced.

Modified Example

Further, the configuration of Embodiment 1 may be partially modified as follows. In Embodiment 1, the second connection terminal 22 and the third connection terminal 23 are connected in the respective source terminal parts 4 (see FIG. 2), and the connection between the second connection terminal 22 and the third connection terminal 23 is cut off as necessary (see FIG. 3). On the other hand, the second connection terminal 22 in one source terminal part 4 and the empty connection terminal (the terminal on the right side of the amplifier connection terminal 27 in FIG. 2) of another source terminal part 4 located adjacent to the one source terminal part 4 may be connected. In this case, the cutting location is located between both source terminal parts 4 and 4, and is separated from the source terminal part 4. Therefore, it is possible to prevent an occurrence of a problem in the source terminal part 4 due to residues, or the like, which is generated during cutting off.

Embodiment 2

Figure 4:
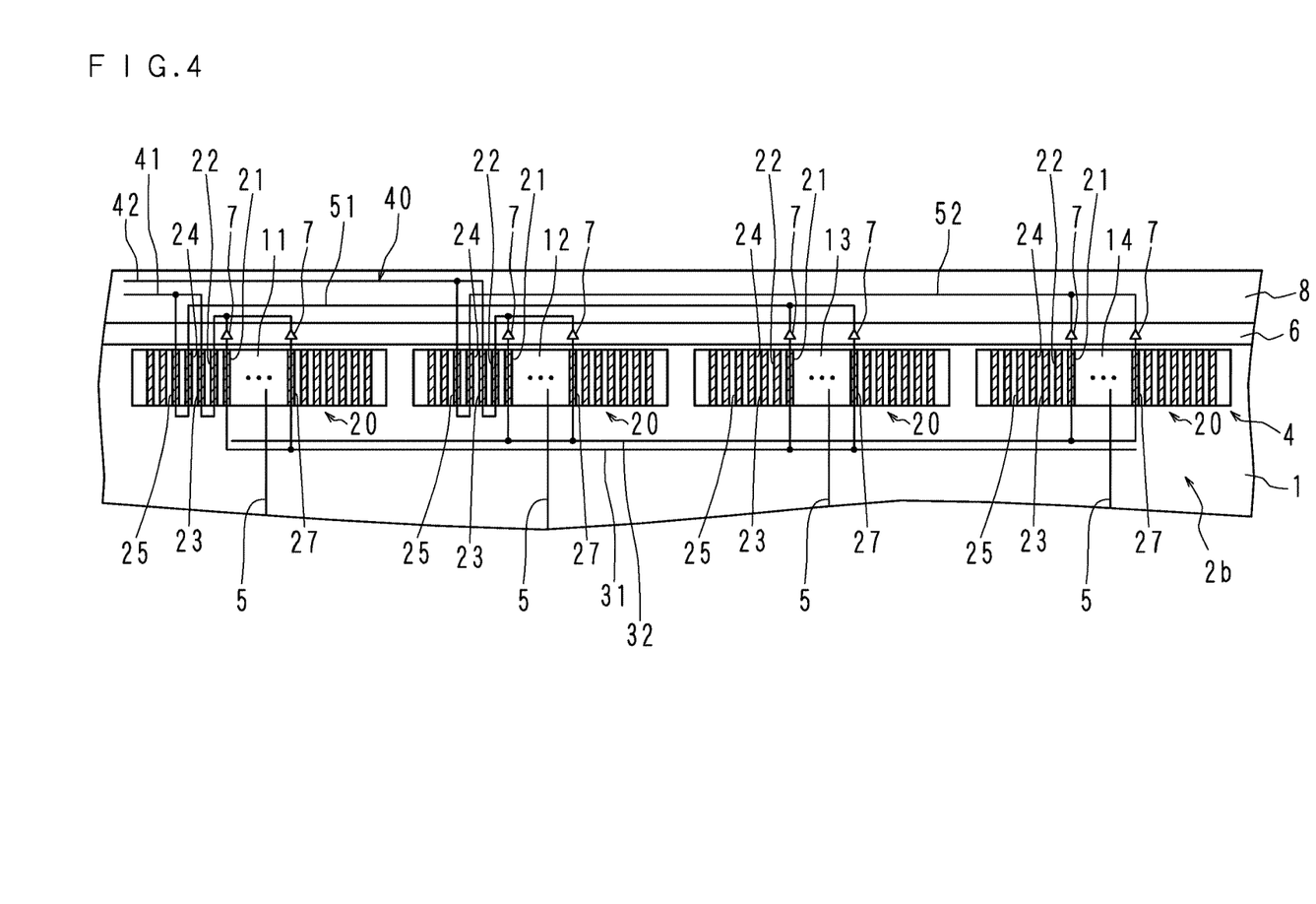
FIG. 4 is an enlarged plan view schematically illustrating a configuration in the vicinity of a source terminal part of a display apparatus according to Embodiment 2.

Hereinafter, the present invention will be described with reference to the drawings illustrating a display apparatus according to Embodiment 2. FIG. 4 is an enlarged plan view schematically illustrating a configuration in the vicinity of a source terminal part 4.

The first to fourth source terminal parts 11 to 14 include fourth and fifth connection terminals 24 and 25. The fourth and fifth connection terminals 24 and 25 are sequentially arranged adjacent to the third connection terminal 23. The source substrate 8 is provided with a first wiring 51 extending in the lateral direction across the first and third source terminal parts 11 and 13. The output sides of both amplifiers 7 connected to the third source terminal part 13 and the fourth connection terminal 24 in the first source terminal part 11 are connected through the first wiring 51.

A part of the first wiring 51 is connected to the fourth connection terminal 24 in the first source terminal part 11, is routed from the outside of the display panel 1 to the display panel 1, is further connected to the fifth connection terminal 25 in the first source terminal part 11, is routed to the outside of the display panel 1, and is connected to the first spare wiring 41.

The source substrate 8 is provided with a second wiring 52 extending in the lateral direction across the second and fourth source terminal parts 12 and 14. The output sides of both the amplifiers 7 connected to the fourth source terminal part 14 and the fourth connection terminal 24 in the second source terminal part 12 are connected through the second wiring 52.

A part of the second wiring 52 is connected to the fourth connection terminal 24 in the second source terminal part 12, is routed from the outside of the display panel 1 to the display panel 1, is further connected to the fifth connection terminal 25 in the second source terminal part 12, is routed to the outside of the display panel 1, and is connected to the second spare wiring 42.

Further, the empty connection terminals 20 for spares are used as the second to fifth connection terminals 22 to 25, and the limited space of the display panel 1 is efficiently used.

Figure 5:
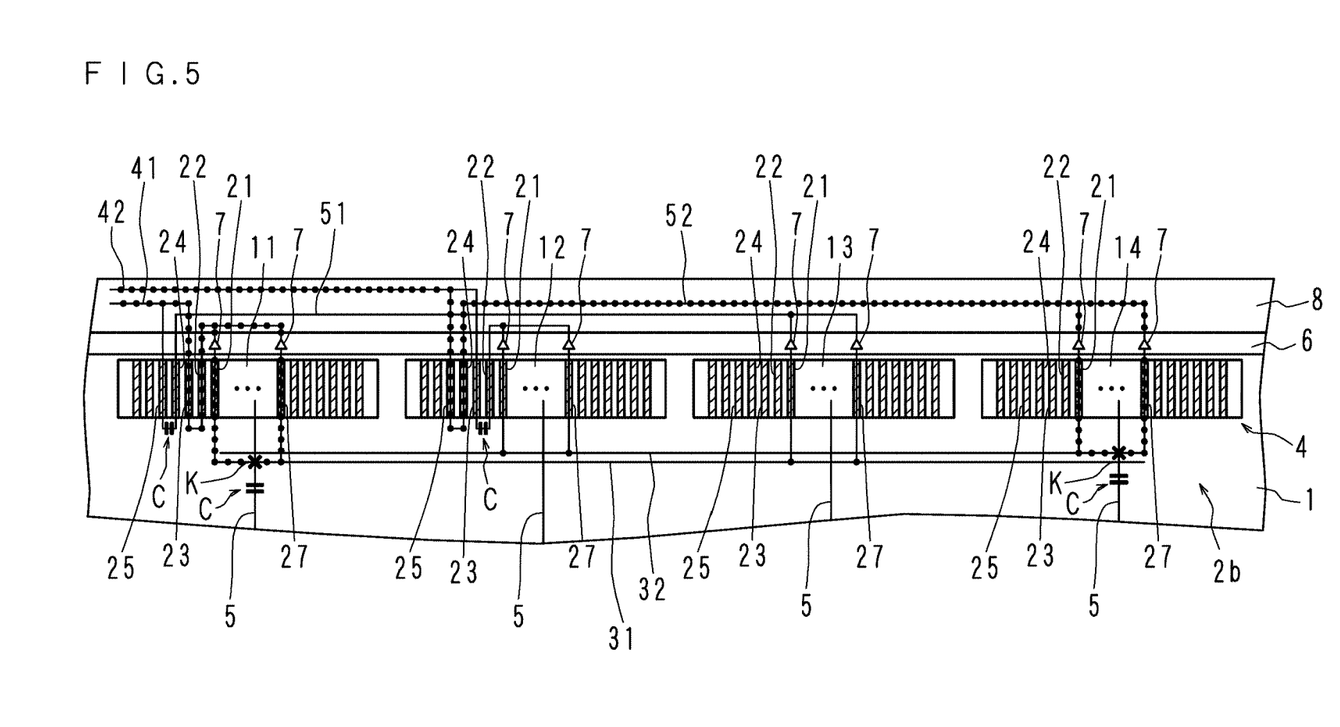
FIG. 5 is an enlarged plan view schematically illustrating a state in which data signal lines are connected to a first trunk line and a second trunk line, respectively when the respective data signal lines corresponding to first and fourth source terminal parts are disconnected.

FIG. 5 is an enlarged plan view schematically illustrating a state in which the data signal lines 5 and 5 are connected to the first trunk line 31 and the second trunk line 32, respectively when the respective data signal lines 5 and 5 corresponding to the first and fourth source terminal parts 11 and 14 are disconnected.

An inspection to check whether the data signal line 5 is disconnected is performed on the display apparatus, and then the display apparatus is manufactured. In this inspection, for example, when it is found that the data signal line 5 corresponding to the first source terminal part 11 is disconnected, one end part of the data signal line 5 and the first trunk line 31 are melt connected. In addition, in the other long side portion of the display panel 1, by irradiating the respective intersection points of the other end part of the data signal line 5 and first spare wiring 41 and the trunk lines with a laser beam, the respective intersection points are melt connected. Further, in the first source terminal part 11, the connection of the fourth and fifth connection terminals 24 and 25 is cut off.

For example, when it is found that the data signal line 5 corresponding to the fourth source terminal part 14 is disconnected, one end part of the data signal line 5 and the second trunk line 32 are melt connected. Further, on the other long side portion of the display panel 1, by irradiating the respective intersection points of the other end part of the data signal line 5 and second spare wiring 42 and the trunk lines with a laser beam, the respective intersection points are melt connected. Further, in the second source terminal part 12, the connection of the second and third connection terminals 22 and 23 is cut off.

In the display apparatus and a method of manufacturing the display apparatus according to Embodiment 2, for example, when connecting the data signal line 5 corresponding to the first source terminal part 11 and the first spare wiring 41, the fourth and fifth connection terminals 24 and 25 in the first source terminal part 11 are disconnected. When connecting the data signal line 5 corresponding to the fourth source terminal part 14 and the second spare wiring 42, the second and third connection terminals 22 and 23 in the second source terminal part 12 are disconnected. The first to fifth connection terminals 22 to 25, which are in a location where the first spare wiring 41, the second spare wiring 42, the first wiring 51 and second wiring 52, may be concentrated in the first and second source terminal parts 11 and 12. Since the locations to be disconnected are concentrated, manufacturing efficiency of the display apparatus may be improved.

The same parts of the configuration according to Embodiment 2 as those in Embodiment 1 will be denoted by the same reference numerals, and will not be described in detail.

Embodiment 3

Figure 6:
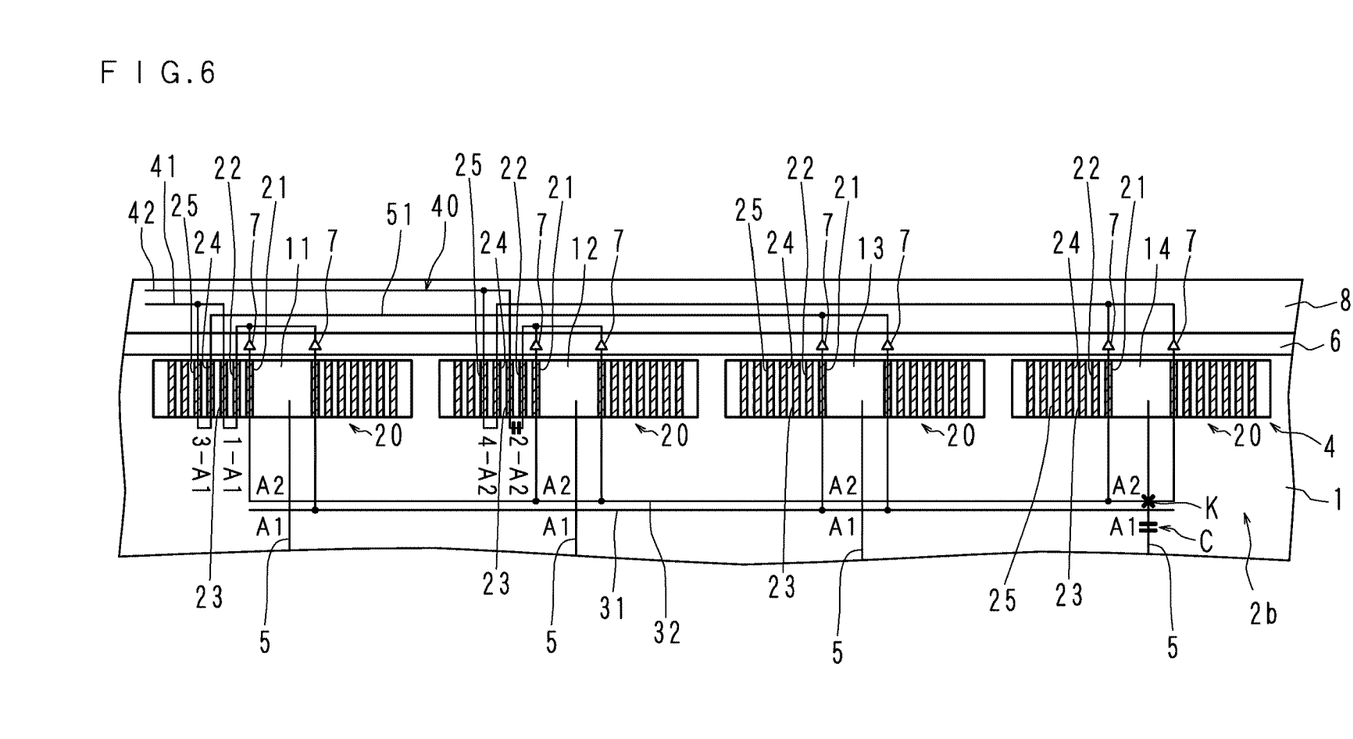
FIG. 6 is an enlarged plan view schematically illustrating a state in which data signal lines are connected to a first trunk line and a second trunk line respectively when the respective data signal lines corresponding to first and fourth source terminal parts of a display apparatus according to Embodiment 3 are disconnected.

Hereinafter, the present invention will be described with reference to the drawings illustrating a display apparatus according to Embodiment 3. FIG. 6 is an enlarged plan view schematically illustrating a state in which the data signal lines 5 and 5 are connected to the first trunk line 31 and the second trunk line 32 respectively when the respective data signal lines 5 and 5 corresponding to the first and fourth source terminal parts 11 and 14 are disconnected. Except for identification marks to be described below, the configuration of the display apparatus according to Embodiment 3 is equal to that of Embodiment 2.

In addition, "A1" and "A2" for identifying the first trunk line 31 and the second trunk line 32 are denoted in the vicinity of the first trunk line 31 and the second trunk line 32, respectively.

"1-A1" is denoted to a connection portion of the second and third connection terminals 22 and 23 in the first source terminal part 11, "3-A1" is denoted to a connection portion of the fourth and fifth connection terminals 24 and 25 in the first source terminal part 11, "2-A2" is denoted to a connection portion of the second and third connection terminals 22 and 23 in the second source terminal part 12, and "4-A2" is denoted to a connection portion of the fourth and fifth connection terminals 24 and 25 in the second source terminal part 12.

Identification marks in a type of "X-AY" (wherein, X=1 to 4 and Y=1 or 2) indicate portions connected to the X-th source terminal part and the Y-th trunk line. For example, "1-A1" indicates a portion connected to the first source terminal part 11 and the first trunk line 31. Further, "Terminal 1" to "Terminal 4" for identifying the first to fourth source terminal parts 11 to 14 may be denoted to the first to fourth source terminal parts 11 to 14, respectively.

In the display apparatus and a method of manufacturing the display apparatus according to Embodiment 3, by providing the identification marks, a manufacturer may confirm the identification marks to easily recognize the location to be disconnected. Therefore, it is possible to increase the manufacturing efficiency of the display apparatus.

Embodiment 4

Figure 7:
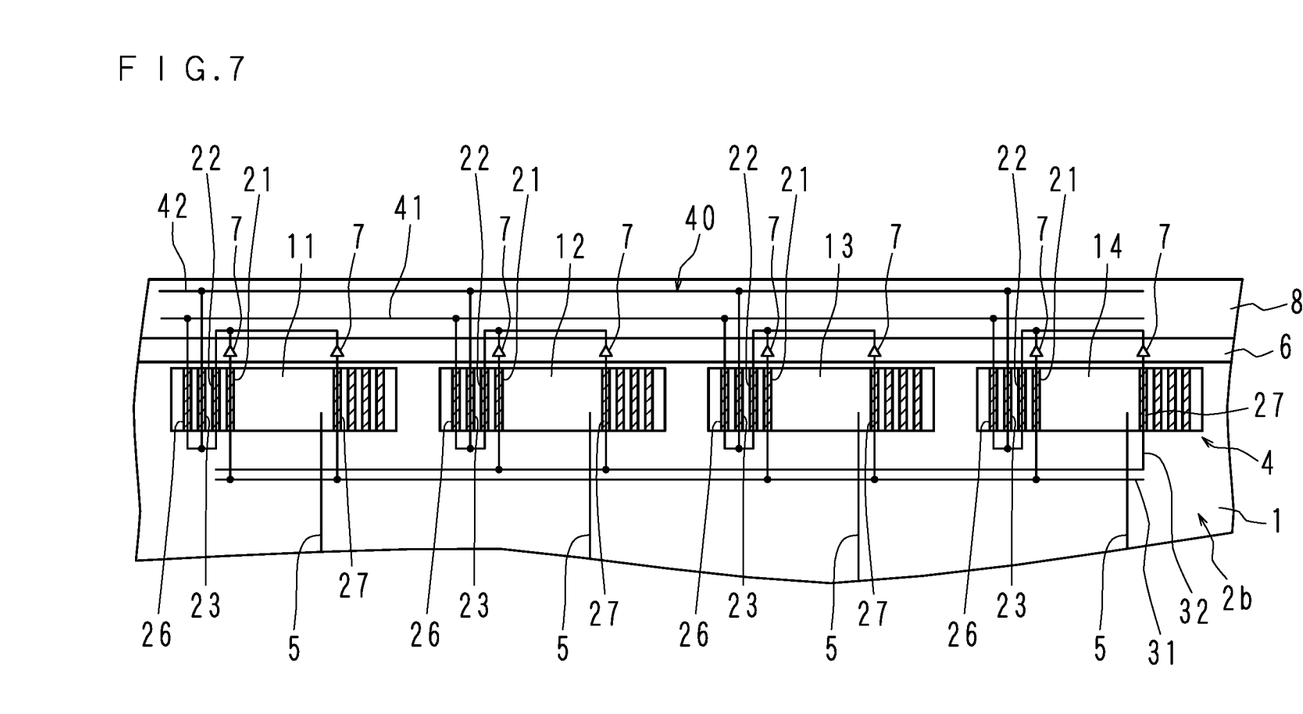
FIG. 7 is an enlarged plan view schematically illustrating a configuration in the vicinity of a source terminal part of a display apparatus according to Embodiment 4.

Hereinafter, the present invention will be described with reference to the drawings illustrating a display apparatus according to Embodiment 4. FIG. 7 is an enlarged plan view schematically illustrating a configuration in the vicinity of a source terminal part 4.

In the first to fourth source terminal parts 11 to 14, the sixth connection terminal 26 is provided adjacent to the third connection terminal 23. The output side of the amplifier 7 is connected to the second spare wiring 42. A part of the second spare wiring 42 is connected to the second connection terminal 22, is routed in the display panel 1, is further connected to the third connection terminal 23, and is routed to the outside of the display panel 1. In addition, a part of the first spare wiring 41 is connected to the sixth connection terminal 26, is routed to the display panel 1, and is connected to the second spare wiring 42.

The empty connection terminals 20 for spares are used as the second, third and sixth connection terminals 22, 23 and 26, and the limited space of the display panel 1 is efficiently used.

Figure 8:
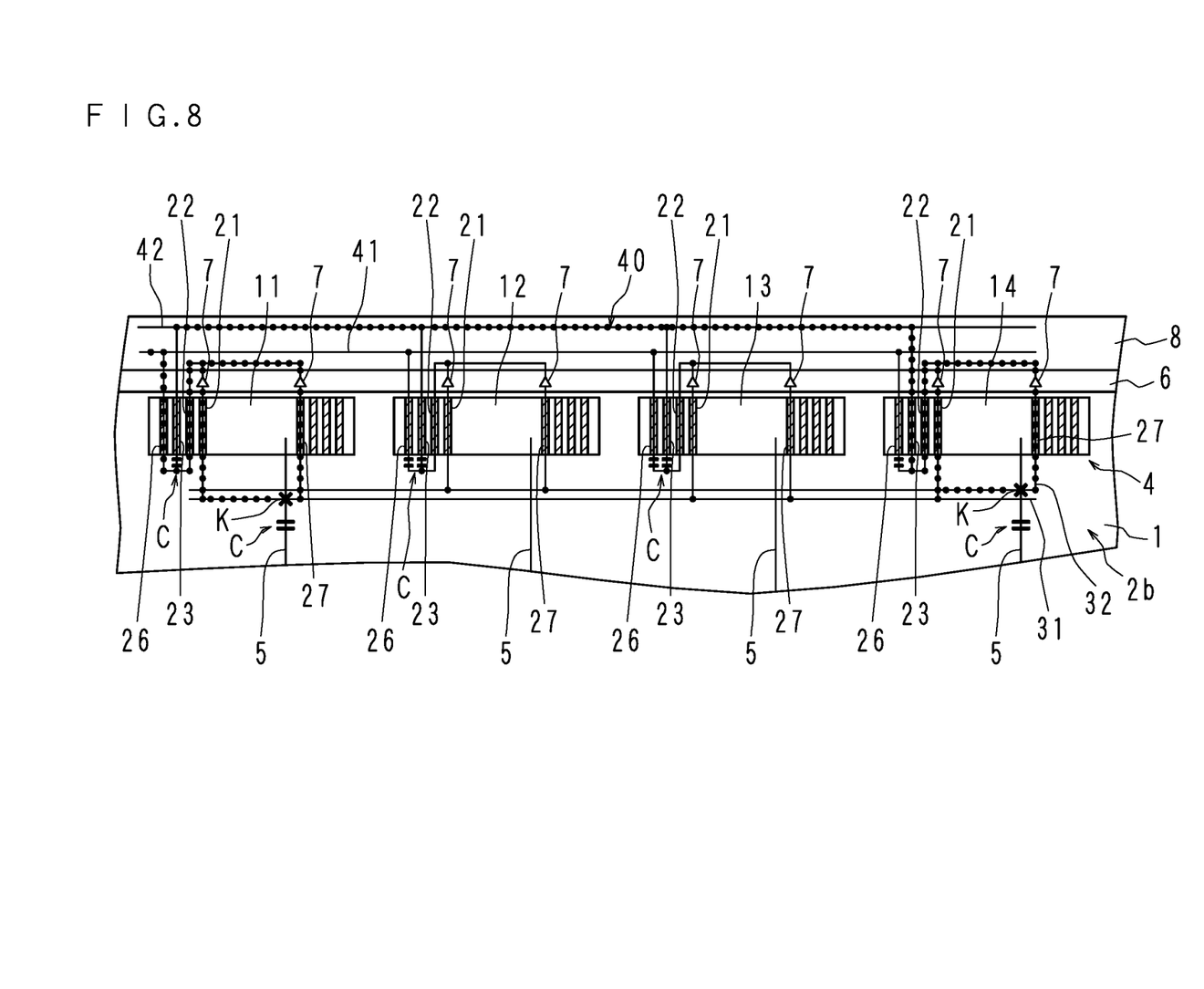
FIG. 8 is an enlarged plan view schematically illustrating a state in which the data signal lines are connected to a first trunk line and a second trunk line respectively when the respective data signal lines corresponding to first and fourth source terminal parts are disconnected.

FIG. 8 is an enlarged plan view schematically illustrating a state in which the data signal lines 5 and 5 are connected to the first trunk line 31 and the second trunk line 32 respectively when the respective data signal lines 5 and 5 corresponding to the first and fourth source terminal parts 11 and 14 are disconnected.

An inspection to check whether the data signal line 5 is disconnected is performed on the display apparatus, and then the display apparatus is manufactured. In this inspection, for example, when it is found that the data signal line 5 corresponding to the first source terminal part 11 is disconnected, one end part of the data signal line 5 and the first trunk line 31 are melt connected. In addition, in the other long side portion of the display panel 1, by irradiating the respective intersection points of the other end part of the data signal line 5 and first spare wiring 41 and the trunk lines with a laser beam, the respective intersection points are melt connected. Further, in the second to fourth source terminal part 12 to 14, the connection of the sixth connection terminal 26 and the second and third connection terminals 22 and 23 is cut off.

For example, when it is found that the data signal line 5 corresponding to the fourth source terminal part 14 is disconnected, one end part of the data signal line 5 and the second trunk line 32 are melt connected. In addition, on the other long side portion of the display panel 1, by irradiating the respective intersection points of the other end part of the data signal line 5 and second spare wiring 42 and the trunk lines with a laser beam, the respective intersection points are melt connected. Further, in the first to third source terminal parts 11 to 13, the connection of the third connection terminal 23 and the second and sixth connection terminals 22 and 26 are cut off.

In the display apparatus and a method of manufacturing the display apparatus according to Embodiment 4, for example, when a signal line corresponding to the fourth source terminal part 14 is connected to the second spare wiring 42, the connection of the first to third source terminal parts 11 to 13 and the second spare wiring 42 are cut off.

In addition, for example, when a signal line corresponding to the first source terminal part 11 is connected to the first spare wiring 41, the connection of the second to fourth source terminal parts 12 to 14 and the first spare wiring 41 is cut off.

The same parts of the configuration according to Embodiment 4 as those in Embodiments 1 to 3 will be denoted by the same reference numerals, and will not be described in detail.

Further, in Embodiment 1 or 4, the identification marks may be provided as similar to Embodiment 3. In addition, also in Embodiments 2 to 4, as similar to Embodiment 1, the resistance of the spare wiring in the display panel 1 is higher than the resistance of the spare wiring in the outside of the display panel 1.

It is to be noted that, as used herein and in the appended claims, the singular forms "a", "an", and "the" include plural referents unless the context clearly dictates otherwise.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

The invention claimed is:

1. A display apparatus, comprising:
   a display panel having a display region and a non-display region located at peripheries of the display region;
   a first connection part which is located in the non-display region and comprises one or more connection terminals including a first connection terminal;
   a second connection part which is located in the non-display region and comprises one or more connection terminals including a first connection terminal;
   a first signal line which is elongated from the first connection part to the display region and transmits an image signal;
   a second signal line which is elongated from the second connection part to the display region and transmits an image signal;
   a first amplifier which is located outside of the display panel and of which an input side is connected to the first connection terminal of the first connection part;
   a second amplifier which is located outside of the display panel and of which an input side is connected to the first connection terminal of the second connection terminal;
   a trunk line joined with each first connection terminal of the first connection part and the second connection part, and connectable to each of the first signal line and the second signal line; and
   a first spare wiring which is connected to at least two spare wiring connection terminals except the first connection terminal in the one or more connection terminals of the first connection part and the second connection part, is routed to the non-display region and the outside of the display panel, and is connectable to each of the first signal line and the second signal line, wherein
   a part of a wiring which joins one of the two spare wiring connection terminals to an output side of the first amplifier and a part of a wiring which joins the other of the two spare wiring connection terminals to an output side of the second amplifier are located in the non-display region.

2. The display apparatus according to the claim 1, wherein each of the first connection part and the second connection part comprises a second connection terminal and a third connection terminal in addition to the first connection terminal,
   the first spare wiring is connected to each of the third connection terminals of the first connection part and the second connection part, the display apparatus further comprises:
a first connection line which is connected to the output side of the first amplifier and is connected to the second connection terminal of the first connection part from outside of the display panel;
a second connection line which is connected to the output side of the second amplifier and is connected to the second connection terminal of the second connection part from outside of the display panel;
a first terminal wiring which is joined with the second connection terminal of the first connection part and the third connection terminal of the first connection part and which is located in the non-display region; and
a second terminal wiring which is joined with the second connection terminal of the second connection part and the third connection terminal of the second connection part and which is located in the non-display region.

3. The display apparatus according to claim 1, wherein
the first connection part comprises a second connection terminal, a third connection terminal, a fourth connection terminal and a fifth connection terminal in addition to the first connection terminal,
the first spare wiring is connected to each of the third connection terminal and the fifth connection terminal,
the display apparatus further comprises:
a first connection line which is connected to the output side of the first amplifier and is connected to the second connection terminal from outside of the display panel;
a third connection line which is connected to the output side of the second amplifier and is connected to the fourth connection terminal from outside of the display panel;
a first terminal wiring which is joined with the second connection terminal and the third connection terminal and is located in the non-display region; and
a third terminal wiring which is joined with the fourth connection terminal and the fifth connection terminal and is located in the non-display region.

4. The display apparatus according to claim 3, comprising an identification mark configured to identify the first terminal wiring and the third terminal wiring.

5. The display apparatus according to claim 1, wherein
each of the first connection part and the second connection part comprises a second connection terminal, a third connection terminal, and a sixth connection terminal in addition to the first connection terminal,
the first spare wiring is connected to each of the third connection terminals of the first connection part and the second connection part,
the display apparatus further comprises:
a second spare wiring which is connected to each of the sixth connection terminals of the first connection part and the second connection part, is routed to the non-display region and the outside of the display panel, and is connectable to each of the first signal line and the second signal line;
a first connection line which is connected to the output side of the first amplifier and is connected to the second connection terminal of the first connection part from outside of the display panel;
a second connection line which is connected to the output side of the second amplifier and is connected to the second connection terminal of the second connection part from outside of the display panel;
a fourth terminal wiring which is joined with the second connection terminal of the first connection part, the third connection terminal of the first connection part and the sixth connection terminal of the first connection part and which is located in the non-display region; and
a fifth terminal wiring which is joined with the second connection terminal of the second connection part, the third connection terminal of the second connection part and the sixth connection terminal of the second connection part and which is located in the non-display region.

6. The display apparatus according to claim 1, wherein the display panel is provided with a substrate having the first spare wiring on the outside of the substrate.

7. A method of manufacturing a display apparatus according to the claim 1, comprising:
an inspection step of inspecting whether the first signal line and the second signal line are disconnected; and
a repairing step of connecting the first signal line and each of the trunk line and the first sparing wire and cutting the part of the wiring which joins the other of the two spare wiring connection terminals to the output side of the second amplifier and the part of the wiring is located in the non-display region if a disconnection of the first signal line is detected in the inspection step.

8. A method of manufacturing a display apparatus according to the claim 7, wherein
each of the first connection part and the second connection part comprises a second connection terminal and a third connection terminal in addition to the first connection terminal,
the first spare wiring is connected to each of the third connection terminals of the first connection part and the second connection part,
the display apparatus further comprises:
a first connection line which is connected to the output side of the first amplifier and is connected to the second connection terminal of the first connection part from outside of the display panel;
a second connection line which is connected to the output side of the second amplifier and is connected to the second connection terminal of the second connection part from outside of the display panel;
a first terminal wiring which is joined with the second connection terminal of the first connection part and the third connection terminal of the first connection part and which is located in the non-display region; and
a second terminal wiring which is joined with the second connection terminal of the second connection part and the third connection terminal of the second connection part and which is located in the non-display region, and
the first signal line is connected to each of the trunk line and the first spare wiring, and the second terminal wiring is cut in the repairing step if the disconnection of the first signal line is detected in the inspection step.

9. A method of manufacturing a display apparatus according to the claim 7, wherein
the first connection part comprises a second connection terminal, a third connection terminal, a fourth connection terminal and a fifth connection terminal in addition to the first connection terminal,
the first spare wiring is connected to each of the third connection terminal and the fifth connection terminal,
the display apparatus further comprises:
a first connection line which is connected to the output side of the first amplifier and is connected to the second connection terminal from outside of the display panel;

a third connection line which is connected to the output side of the second amplifier and is connected to the fourth connection terminal from outside of the display panel;

a first terminal wiring which is joined with the second connection terminal and the third connection terminal and is located in the non-display region; and a third terminal wiring which is joined with the fourth connection terminal and the fifth connection terminal and is located in the non-display region, and the first signal line is connected to each of the trunk line and the first spare wiring, and the third terminal wiring is cut in the repairing step if the disconnection of the first signal line is detected in the inspection step.

10. A method of manufacturing a display apparatus according to the claim 7, wherein each of the first connection part and the second connection part comprises a second connection terminal, a third connection terminal, and a sixth connection terminal in addition to the first connection terminal, the first spare wiring is connected to each of the third connection terminals of the first connection part and the second connection part, the display apparatus further comprises:

a second spare wiring which is connected to each of the sixth connection terminals of the first connection part and the second connection part, is routed to the non-display region and the outside of the display panel, and is connectable to each of the first signal line and the second signal line;

a first connection line which is connected to the output side of the first amplifier and is connected to the second connection terminal of the first connection part from outside of the display panel;

a second connection line which is connected to the output side of the second amplifier and is connected to the second connection terminal of the second connection part from outside of the display panel;

a fourth terminal wiring which is joined with the second connection terminal of the first connection part, the third connection terminal of the first connection part and the sixth connection terminal of the first connection part and which is located in the non-display region; and a fifth terminal wiring which is joined with the second connection terminal of the second connection part, the third connection terminal of the second connection part and the sixth connection terminal of the second connection part and which is located in the non-display region, and the first signal line is connected to each of the trunk line and the first spare wiring, and an joining of the fourth terminal wiring and the sixth connection terminal of the first connection part, an joining of the fifth terminal wiring and the third connection terminal of the second connection part, and an joining of the fifth terminal wiring and the sixth connection terminal of the second connection part are cut, or the first signal line is connected to each of the trunk line and the second spare wiring, and an joining of the fourth terminal wiring and the third connection terminal of the first connection part, an joining of the fifth terminal wiring and the third connection terminal of the second connection part, and an joining of the fifth terminal wiring and the sixth connection terminal of the second connection part are cut if the disconnection of the first signal line is detected in the inspection step.

* * * * *